(12) United States Patent
Ungerecht et al.

(10) Patent No.: US 8,567,433 B2
(45) Date of Patent: Oct. 29, 2013

(54) PRESSURE REGULATOR WITH MANUAL SHUT-OFF VALVE

(75) Inventors: Cliff P. Ungerecht, Walla Walla, WA (US); Craig B. Nelson, Walla Walla, WA (US)

(73) Assignee: Nelson Irrigation Corporation, Walla Walla, WA (US)

( * ) Notice: Subject to any disclaimer, the term of this patent is extended or adjusted under 35 U.S.C. 154(b) by 306 days.

(21) Appl. No.: 13/045,814

(22) Filed: Mar. 11, 2011

(65) Prior Publication Data

US 2012/0227838 A1    Sep. 13, 2012

(51) Int. Cl.
F16K 31/12    (2006.01)
F16K 31/36    (2006.01)
F16K 31/14    (2006.01)
F16K 31/44    (2006.01)

(52) U.S. Cl.
USPC ............ 137/505.25; 137/495; 251/252

(58) Field of Classification Search
USPC ............ 137/495, 505.14, 505.25, 505.28; 251/251, 252, 253, 256, 257, 262, 263
See application file for complete search history.

(56) References Cited

U.S. PATENT DOCUMENTS

| | | | |
|---|---|---|---|
| 4,516,600 A * | 5/1985 | Sturman et al. | 137/495 |
| 6,374,853 B1 | 4/2002 | Callies | |
| 6,752,169 B2 | 6/2004 | Callies | |
| 6,923,205 B2 | 8/2005 | Callies | |
| 7,140,595 B2 | 11/2006 | Youngberg et al. | |
| 7,628,910 B2 | 12/2009 | Lockwood | |
| 2010/0038450 A1* | 2/2010 | Sesser et al. | 239/222.17 |

OTHER PUBLICATIONS

U.S. Appl. No. 13/105,620, filed May 11, 2011. Pending.

* cited by examiner

*Primary Examiner* — Stephen M Hepperle
*Assistant Examiner* — Michael R Reid
(74) *Attorney, Agent, or Firm* — Nixon & Vanderhye, P.C.

(57) ABSTRACT

A pressure regulator includes a housing assembly defining a fluid flow path from an inlet end to an outlet end; a plunger having a tubular plunger body supported within the housing assembly for linear movement toward and away from a valve seat in response to fluid pressure at the outlet end. A sleeve is supported within the housing assembly and is engageable with the tubular plunger body, and an actuator collar is supported externally of the housing assembly and operatively attached to the sleeve such that rotation of the actuator collar in one direction from an open position to a closed position produces linear movement of the tubular plunger body, independent of the pressure at the outlet end, into engagement with the valve seat to thereby shut off the flow path within the regulator.

23 Claims, 5 Drawing Sheets

PRESSURE REGULATOR WITH MANUAL SHUT-OFF VALVE

BACKGROUND OF THE INVENTION

This invention relates to valves and pressure regulators generally, and specifically to a fluid pressure regulator particularly suited for (but not limited to) use in agricultural irrigation systems.

It is well known to use pressure regulators in irrigation systems in order to provide substantially constant, regulated outlet pressure over a wide range of regulator inlet pressures, to thereby insure the supply of water is maintained at a substantially uniform pressure to a sprinkler or other irrigation device. The need for such regulators is particularly acute in low pressure systems because even slight variations in pressure along a system operating at low pressure causes much greater variations and discharges than the same system operating at high pressure.

The assignee of this invention currently manufactures and sells fluid pressure regulators of the flow-through type, having an inlet at one end of a tubular housing and an outlet at the other end of the tubular housing. A valve or regulator seat is fixed within the housing and is adapted to be engaged by a tubular plunger which is spring biased away from the seat (in the direction of fluid flow) so that under normal conditions, maximum flow through the regulator is permitted. In the event of a pressure surge, the plunger is moved by back pressure within a diaphragm chamber, against the action of an opposed coil spring (and against atmospheric pressure), toward the regulator seat to thereby decrease flow through the regulator until the pressure is reduced, at which point the plunger will stop or, if pressure decreases sufficiently, move upwardly away from the seat to thereby increase the flow. In this way, the plunger constantly seeks an equilibrium position within the regulator to maintain a substantially uniform outlet pressure.

It would be advantageous to incorporate a manual shut-off feature in pressure regulators as described above in order to, for example, facilitate repair/replacement of downstream sprinklers or other components, and/or to turn some sprinklers on and off at various times in a multi-sprinkler system in order to implement desired sprinkling patterns.

BRIEF SUMMARY OF THE INVENTION

In one exemplary but nonlimiting embodiment, the invention provides a pressure regulator comprising a housing assembly defining a fluid flow path from an inlet end to an outlet end; a tubular plunger body supported within the housing assembly for linear movement toward and away from a valve seat in response to fluid pressure at the outlet end; a sleeve supported within the housing assembly and adapted to engage the tubular plunger body; and an actuator collar supported externally of the housing assembly and operatively attached to the sleeve such that rotation of the actuator collar in one direction from an open position produces linear movement of the sleeve and the tubular plunger body independent of the pressure at the outlet end, moving the tubular plunger body into engagement with the valve seat to a closed position, shutting off the flow path.

In another exemplary but nonlimiting aspect, the invention provides pressure regulator comprising a housing assembly defining a fluid flow path from an inlet end to an outlet end, the housing assembly including a lower housing body and a cap secured to the lower housing body; a tubular plunger body supported within the lower housing body and the cap for linear movement toward and away from a valve seat supported in the lower housing body in response to fluid pressure at the outlet end; a sleeve supported within the lower housing body and adapted to engage the tubular plunger body; and an actuator collar supported externally of the lower housing body, the sleeve and the actuator collar provided with means for driving the tubular plunger body linearly in response to rotation of the actuator collar in a first direction.

In still another exemplary but nonlimiting aspect, the invention provides a pressure regulator comprising a housing assembly defining a fluid flow path from an inlet end to an outlet end; a tubular plunger body supported within the housing assembly for linear movement toward and away from a valve seat in response to fluid pressure at the outlet end; a sleeve supported within the housing assembly and adapted to engage the tubular plunger body; and an actuator collar supported externally of the housing assembly, the actuator collar provided with at least one cam element and the sleeve provided with at least one spiral cam groove, the at least one cam element passing through the housing assembly and engaged within the at least one spiral cam groove whereby, when the actuator collar is rotated in one direction, a driving connection is established between the sleeve and the tubular plunger body that moves the tubular plunger body linearly toward the valve seat until a lower edge of the tubular plunger body engages the valve seat to thereby shut off flow through the regulator.

An exemplary but nonlimiting embodiment will now be described in detail in connection with the drawings identified below.

DETAILED DESCRIPTION OF THE DRAWINGS

Figure 1:
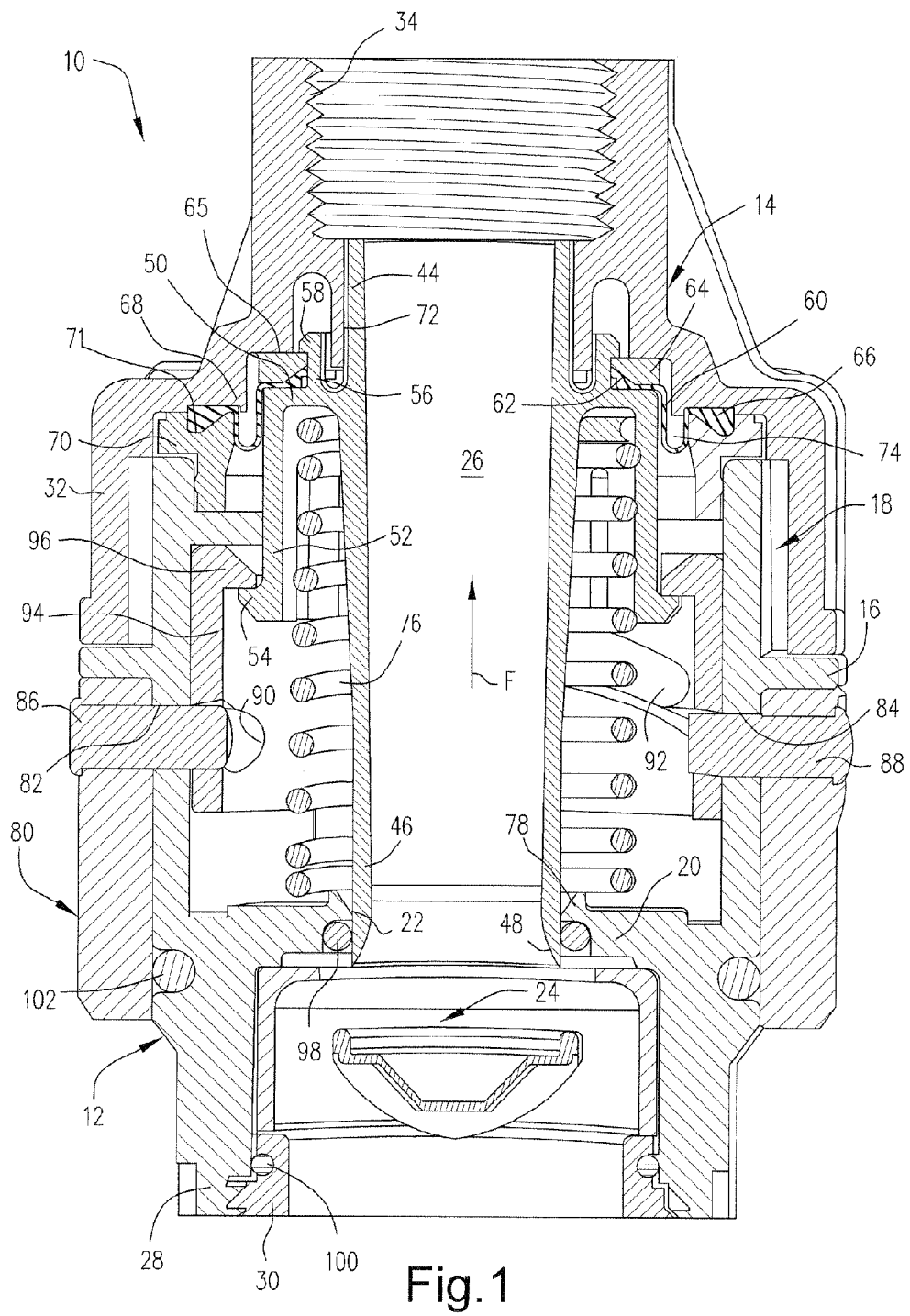
FIG. 1 is a cross section of a pressure regulator in accordance with a first exemplary embodiment of the invention.
Figure 2:
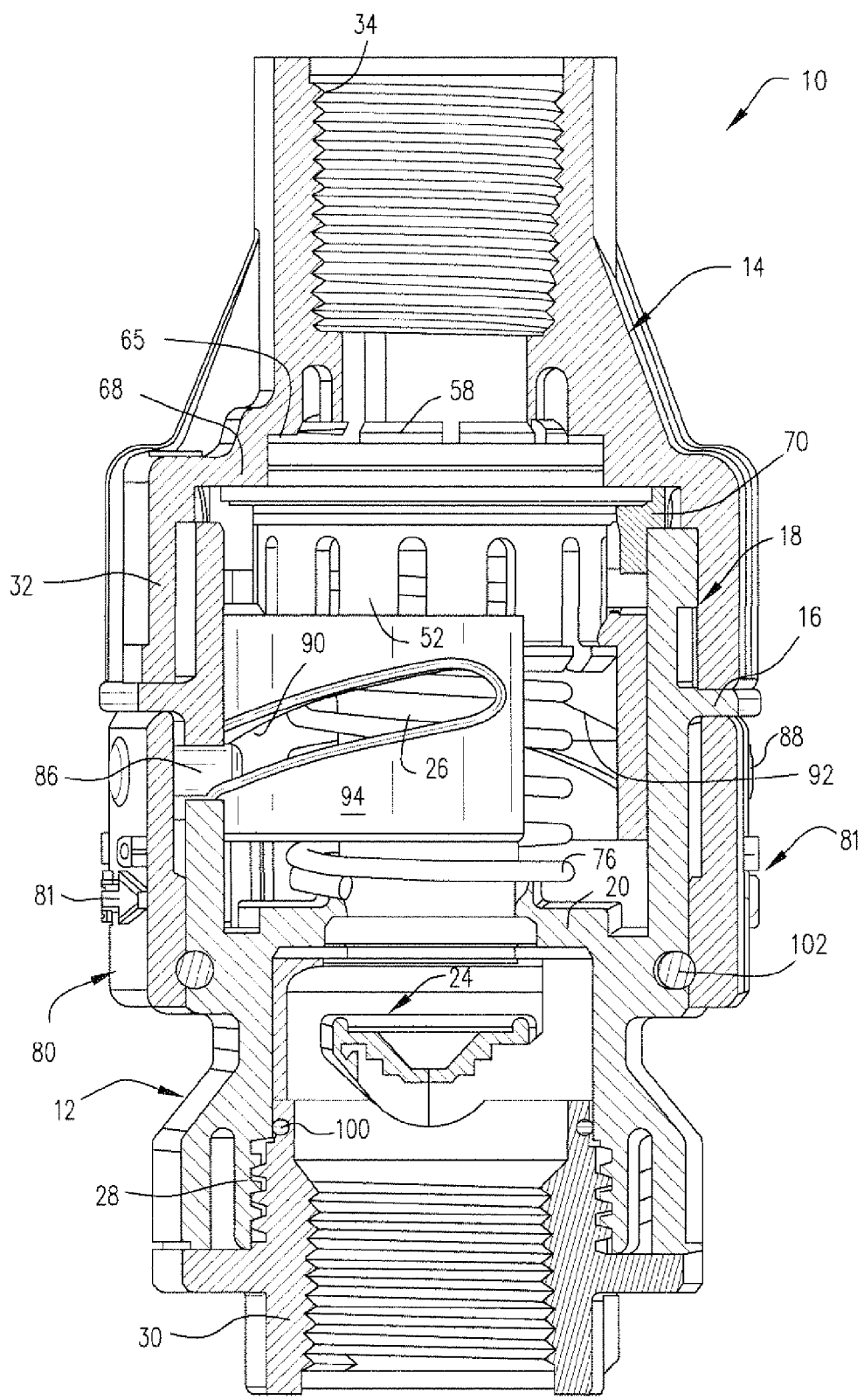
FIG. 2 is a cross section similar to FIG. 1 but rotated approximately 120° in a clockwise direction.
Figure 4:
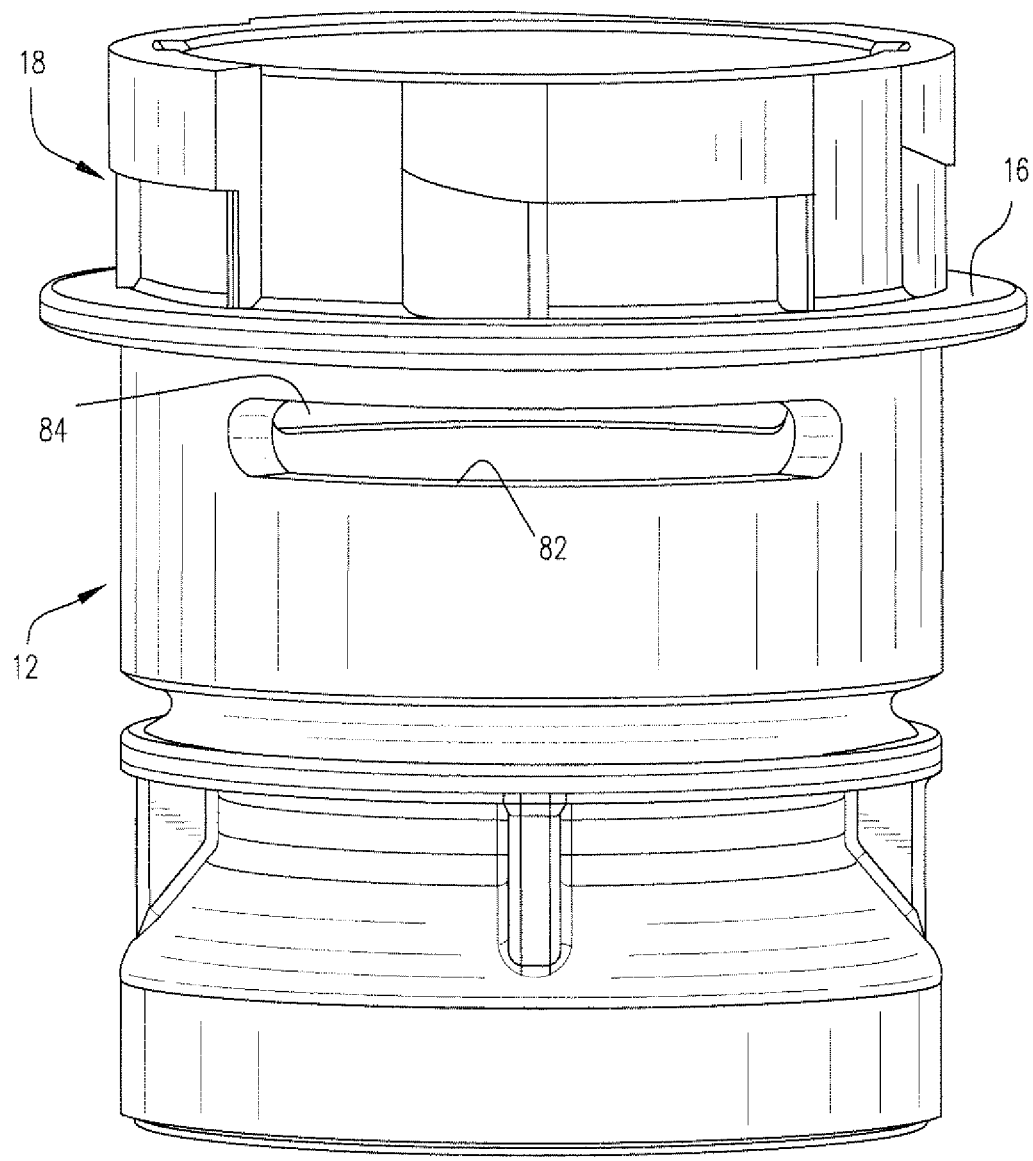
FIG. 4 is a perspective view of a lower housing body removed from the regulator shown in FIGS. 1 and 2.

The pressure regulator 10 shown in FIGS. 1 and 2 includes a housing assembly formed by the attachment of a lower housing body 12 and a cap 14. The lower housing body 12 is a hollow, generally cylindrical component formed with an exterior annular flange 16 and attachment features 18 at its uppermost end which cooperate with associated or complimentary features on the cap (see also FIG. 4). It will be appreciated that the attachment features may include any conventional attachment mechanism including a press-and-turn bayonet-type fitting, screw fasteners or other suitable arrangements. A screw-fastener arrangement is shown in commonly-owned U.S. Pat. No. 7,140,595. The exact manner of fastening the cap 14 to the lower housing body 12 is not significant to this invention so long as it is designed to withstand the high fluid pressure within the unit.

An interior flange 20 defines a center opening 22, and a valve seat 24 and is supported in the lower housing body 12 below flange 20. The seat 24 is engageable by a tubular plunger body 26 that passes through the center opening 22 and that is otherwise supported in the housing assembly as described further herein.

The lower end of the lower housing body 12 is formed with a threaded inlet 28 that receives, for example, an adapter 30 for a relatively small diameter conduit, sprinkler riser or the like.

The cap 14 is formed with a relatively large diameter lower peripheral skirt 32, and an internally-threaded and relatively small diameter upper outlet end or outlet 34, adapted for connection to a water supply conduit, drop hose or the like. It will be understood that the regulator flow path extends along a longitudinal axis passing through the inlet 28, tubular plunger body 26 and outlet 34.

The elongated tubular plunger body 26 is formed with an upper end 44 and a lower end 46. The lower end 46 is formed with a tapered knife edge 48 that serves as a valve, adapted to engage the seat 24 as explained further below.

An annular radial flange 50 is formed at a location below the upper end 44 of the plunger body 26. The flange 50 is formed with a plurality of depending, resilient spring fingers 52 arranged about the tubular plunger body 26, each having a radially outwardly extending support tab 54 at its lowermost end.

The radial flange 50 also supports an upstanding annular wall 56, formed with a radially outwardly extending rim 58. The wall 56 and rim 58 may be discontinuous, i.e., formed as plural, circumferentially-spaced resilient segments.

A diaphragm 60 is arranged radially between the tubular plunger body 26 and the cap 14. Specifically, an enlarged radially inner end 62 of the diaphragm is sandwiched between an annular retention ring 64 and the flange 50. The retention ring 64 is held in place by the rim 58 of the upstanding annular wall 56 and by a shoulder 65 of the cap 14. The radially outer end 66 of the diaphragm is sandwiched between a radial flange portion 68 of the cap 14 and a second annular retention ring 70 secured about the upper end of the lower housing body 12. The second annular retention ring 70 is provided with an annular groove 71 in which the enlarged radially outer end 66 of the diaphragm is received.

During operation, the pressure of the water flowing in the direction of flow arrow F through the tubular plunger body 26 and exiting the outlet end 34 will be applied to the upper side of the diaphragm by way of a radial space between the upper end 44 of the tubular plunger body 26 and the adjacent bore 72 formed in the cap 14. The water is able to follow a path about the annular wall 56 and one or more radial grooves or vents (not shown) in the ring 64 (and/or in the shoulder 65) into the diaphragm chamber 74. Pressure applied in the diaphragm chamber 74 will tend to push the tubular plunger body 26 in a downward direction, causing the knife edge 48 to approach the valve seat 24, thus reducing flow. The force exerted on the tubular plunger body 26 via the diaphragm 60 is opposed by a force exerted by a coil spring 76 seated on a boss 78 of the flange 20, and pushing upwardly against the underside of the plunger body radial flange 50. Thus, as is well understood in the art, as outlet pressure varies, the tubular plunger body 26 will be caused to move toward or away from the seat 24 to thereby decrease or increase flow through the regulator, with the plunger body 26 always seeking a state of equilibrium where the outlet pressure is substantially constant.

This invention relates to the addition of a manual shut-off feature to the pressure regulator 10 that allows a user to stop flow through the pressure regulator independently of the pressure regulation function.

Figure 3:
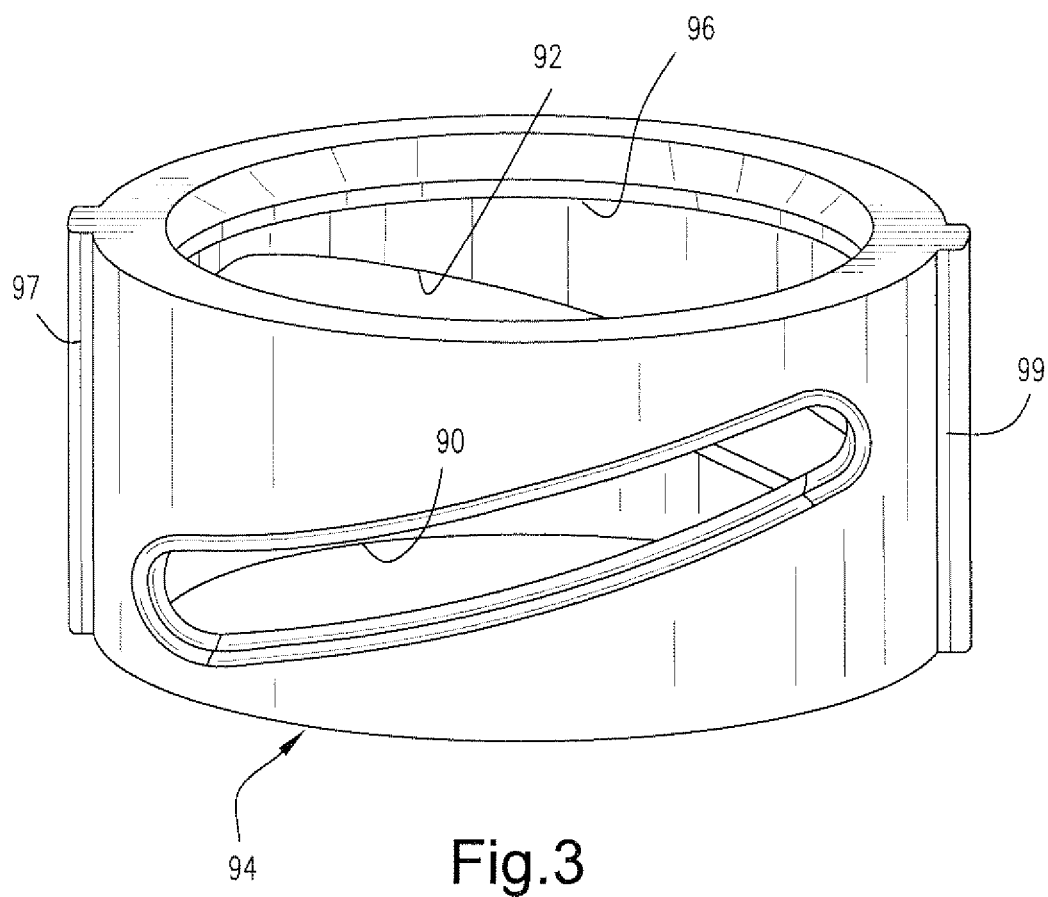
FIG. 3 is a perspective view of the internal sleeve removed from the regulator shown in FIGS. 1 and 2.

Specifically, a rotatable collar 80 is fitted to the outside of the lower housing body 12, below but abutting the flange 16. The fit is such that the collar 80 may rotate relative to the lower housing body 12 upon the exertion of torque on the collar by the user. Coplanar slots 82, 84 (see also FIG. 5) are formed in the lower housing body 12 at substantially diametrically-opposed locations, each slot extending substantially ninety degrees around the lower housing body 12. Relative to the orientation of the regulator as shown in FIGS. 1 and 2, the slots 82, 84 are oriented substantially horizontally. Substantially diametrically-opposed pins 86, 88 are fixed to the collar 80 and extend inwardly through the slots 82, 84. As a result, the actuator collar simply rotates about the longitudinal center axis of the regulator, with no axial movement relative to the housing assembly. The pins 86, 88 extend into respective spiral grooves 90, 92 (FIG. 3) formed in an internal sleeve 94. The spiral grooves 90, 92 extend circumferentially about the sleeve to substantially the same arcuate extent as slots 82, 84.

The internal sleeve 94 surrounds at least part of the tubular plunger body 26 in concentric relationship therewith, and the sleeve is formed as a substantially cylindrical tubular component having a radially inwardly directed rim or flange 96 at its upper end. The rim or flange 96 engages the upper surfaces of the support tabs 54 on the spring fingers 52. Axially-extending keys 97, 99 (FIG. 4) engage within complimentary features (not shown) in the lower housing body 12 to prevent rotation of the sleeve relative to the housing body. Thus the sleeve 94 may engage, but is not fixed to, the tubular plunger body 26.

O-ring seals 98 and 100 prevent water from entering the radial space between the tubular plunger body 26 and the lower housing body 12 which houses the coil spring 76. Another O-ring seal 102 prevents dirt or debris from entering the tolerance space between collar 80 and the lower housing body 12.

When it is desired to shut off flow through the pressure regulator 10, the user simply rotates the collar 80 in a first direction (one or more visual indicators 81 on the collar indicates the direction of rotation that will result in flow shut off), such that the pins (or "cam elements") 86, 88 drive the sleeve 94 and tubular plunger body 26 downwardly, via the caroming action of the pins in the spiral grooves 90, 92 (also referred to as "cam grooves"), until the knife edge 48 engages the seat 24, thereby shutting off all flow through the regulator. Thus, the pins 86, 88 and spiral grooves or slots 90, 92 provide means for driving the tubular plunger body 26 linearly in response to rotation of the collar in the shut-off direction. Note that this calming action is possible because the rim or flange 96 of the sleeve engages the upper surfaces of tabs 54 on the spring fingers 52, forming a one-way driving connection between the sleeve 94 and the tubular plunger body 26.

To resume flow, the collar 80 is rotated in the opposite direction, pulling the sleeve 94 upwardly, but with the driving connection between the sleeve 94 and the tubular plunger body 26 broken, i.e, disconnected. This is because the sleeve rim or flange 96 is free to move upwardly away from the spring fingers 52. As a result, upward movement of the tubular plunger body 26 to an open position is caused not by rotation of the collar 80, but by exertion of the upward biasing force of the coil spring 76 on the tubular plunger body 26 (and possibly enhanced by the increasing flow through the regulator as the collar moves to its open position). Note, however, that the tubular plunger body 26 cannot move upwardly, due to the force executed by coil spring 76 unless the collar 80 is rotated to an upper or open position, pulling the sleeve 94 upwardly to the position shown in FIG. 1.

It will be appreciated that the downward axial movement of the tubular plunger body 26 due to rotation of the collar 80 is limited by the substantially matched lengths of the slots 82, 84 and spiral grooves 90, 92. In other words, the ends of the slots and spiral grooves serve as limit stops for the collar 80 and thus the plunger body 26, so that no damage is done to the seat 24 by the tubular plunger body 26 upon full rotation of the collar 80 in the shut-off direction. Further in this regard, suitable detents may be provided for the pins 86, 88 at the opposite ends of the slots 82, 84 and/or spiral grooves 90, 92 to define the start and stop positions of the collar 80, and to insure that the collar does not rotate in either direction unintentionally.

It will also be appreciated that as the tubular plunger body 26 moves up and down during normal use and with the actuator collar 80 rotated to its open or uppermost position (thus also pulling the sleeve 94 to its uppermost position), there is no interference with the pressure regulation function. This is due to the one-way drive connection between the collar 80 and sleeve 94 on the one hand, and tubular plunger body 26 on the other. To insure proper operation of the regulator, it will be appreciated that the actuator collar 80 must be rotated to its fully open position, where it remains until rotated by the user to shut off the flow through the regulator.

Figure 5:
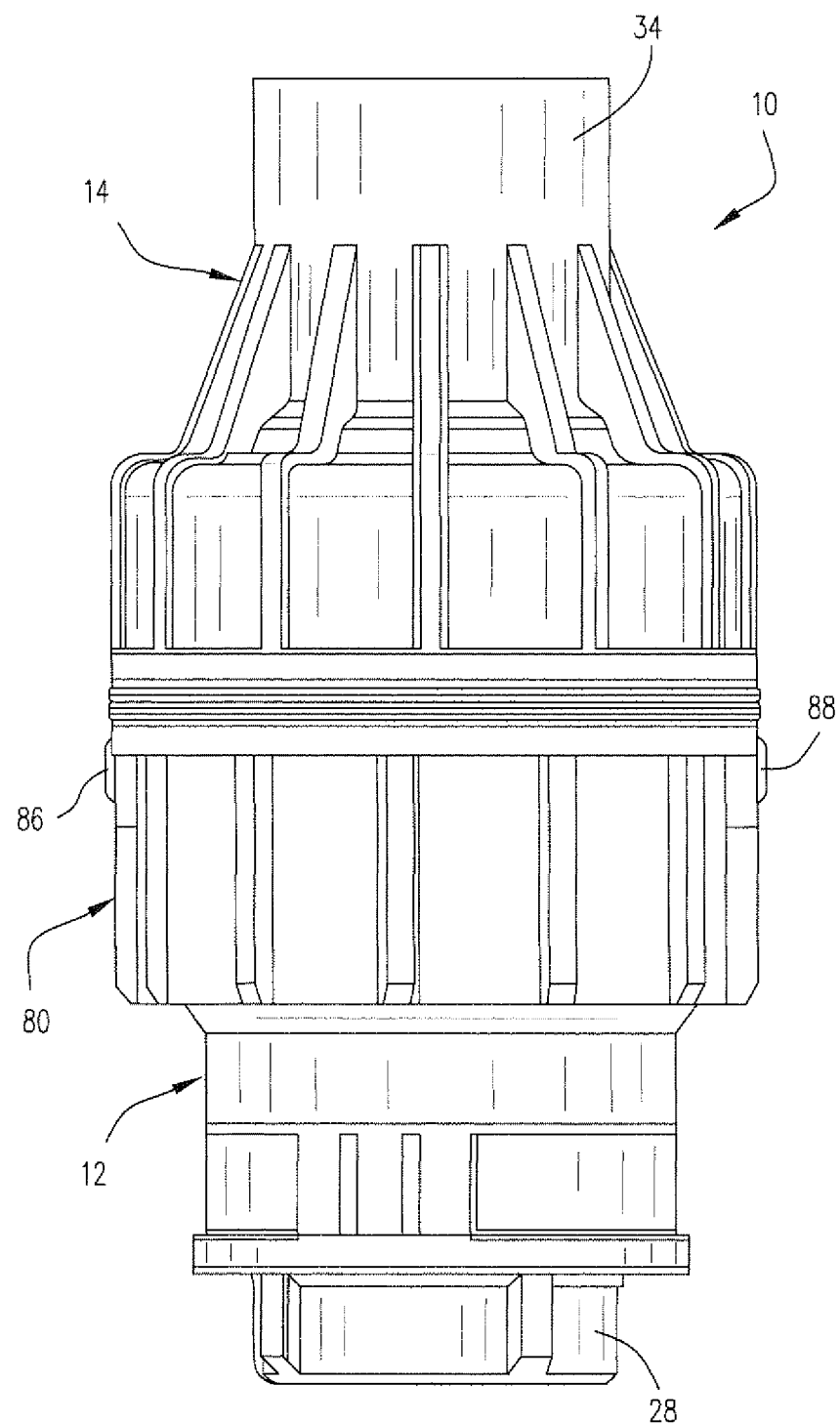
FIG. 5 is a side elevation of the pressure regulator shown in FIGS. 1 and 2.

FIG. 5 is an external view of the pressure regulator 10, illustrating more clearly the streamlined construction where the shut-off or actuator collar 80 only minimally increases the diameter of the regulator, with no protruding handles or the like.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A pressure regulator comprising:
a housing assembly including a longitudinal center axis defining a fluid flow path from an inlet end to an outlet end substantially along said longitudinal center axis;
a tubular plunger body supported within said housing assembly for linear movement toward and away from a valve seat in response to fluid pressure at said outlet end;
a sleeve supported within said housing assembly and adapted to engage said tubular plunger body; and
an actuator collar supported externally of said housing assembly and operatively attached to said sleeve such that rotation of said actuator collar about said longitudinal center axis in one direction from an open position produces linear movement of said sleeve and said tubular plunger body independent of the pressure at said outlet end, moving said tubular plunger body into engagement with said valve seat to a closed position, shutting off said flow path.

2. The pressure regulator of claim 1 wherein rotation of said actuator collar in a second opposite direction from said closed position to said open position permits linear movement of said tubular plunger body away from said valve seat to thereby open said flow path.

3. The pressure regulator of claim 2 wherein, when said actuator collar is in said open position, said tubular plunger body is free to move toward or away from said valve seat solely in response to fluid pressure at said outlet end.

4. The pressure regulator of claim 1 wherein said tubular plunger body is spring-biased in a direction away from said valve seat.

5. The pressure regulator of claim 4 wherein a diaphragm is supported radially between said tubular plunger body and said housing assembly, and wherein said diaphragm is exposed on one side to the fluid pressure at said outlet end to thereby exert a force on said tubular plunger body in a direction toward said valve seat.

6. A pressure regulator comprising:
a housing assembly defining a fluid flow path from an inlet end to an outlet end;
a tubular plunger body supported within said housing assembly for linear movement toward and away from a valve seat in response to fluid pressure at said outlet end;
a sleeve supported within said housing assembly and adapted to engage said tubular plunger body;
an actuator collar supported externally of said housing assembly and operatively attached to said sleeve such that rotation of said actuator in one direction from an open position produces linear movement of said sleeve and said tubular plunger body independent of the pressure at said outlet end, moving said tubular plunger body into engagement with said valve seat to a closed position, shutting off said flow path; and
wherein substantially diametrically-opposed pins are fixed to said actuator collar and extend through respective arcuate slots in said housing assembly and engage within respective spiral grooves in said sleeve, said substantially diametrically-opposed pins and said respective spiral grooves cooperating upon rotation of said actuator collar in said one direction to produce the linear movement of said tubular plunger body.

7. The pressure regulator of claim 5 wherein said tubular plunger body is provided with plural, axially-extending spring fingers in an annular array, said plural, axially-extending spring fingers formed with respective radially outwardly extending support tabs at free ends thereof, said sleeve formed at its upper end with an annular rim supported on said radially outwardly extending support tabs.

8. The pressure regulator of claim 1 wherein said housing assembly comprises a lower housing body and a cap, said cap having a threaded portion at said outlet end, and an internal annular wall receiving an upper end of said tubular plunger body.

9. The pressure regulator of claim 7 wherein said housing assembly comprises a lower housing body and a cap, said cap having a threaded portion at said outlet end, and an internal annular wall receiving an upper end of said tubular plunger body, a radial flange extending from said tubular plunger body, with said plural, axially-extending spring fingers extending downwardly from said radial flange.

10. The pressure regulator of claim 9 wherein a radially inner end of said diaphragm is held in place by an annular retention ring; said radial flange formed with an annular upstanding wall, terminating at a radially outwardly extending rim at an upper end thereof, said rim engaged with said retention ring.

11. A pressure regulator comprising:
a housing assembly having a longitudinal center axis defining a fluid flow path from an inlet end to an outlet end, said housing assembly including a lower housing body and a cap secured to said lower housing body;
a tubular plunger body supported within said lower housing body and said cap for linear movement toward and away from a valve seat supported in said lower housing body in response to fluid pressure at said outlet end;
a sleeve supported within said lower housing body and adapted to engage said tubular plunger body; and
an actuator collar supported externally of, and surrounding said lower housing body, said sleeve and said actuator collar provided with means for driving said tubular plunger body linearly in response to rotation of said actuator collar in a first direction about said longitudinal axis into engagement with said valve seat.

12. The pressure regulator of claim 11 wherein said tubular plunger body is spring-biased in a direction away from said valve seat.

13. The pressure regulator of claim 12 wherein a diaphragm is supported radially between said tubular plunger body and said cap, and wherein said diaphragm is exposed on one side to fluid pressure at said outlet end to thereby exert a force on said tubular plunger body in a direction toward said valve seat.

14. The pressure regulator of claim 11 wherein said means comprise a pair of substantially diametrically-opposed pins fixed to said actuator collar and engaging within respective spiral slots in said sleeve; said pair of substantially diametrically-opposed pins passing through respective arcuate grooves in said lower housing body.

15. The pressure regulator of claim 11 wherein said tubular plunger body is provided with plural, axially-extending spring fingers in an annular array, said plural, axially-extending spring fingers formed with respective radially outwardly extending tabs at free ends thereof, said sleeve formed at its upper end with an annular rim supported on said radially outwardly extending tabs.

16. The pressure regulator of claim 15 wherein said cap is provided with a threaded portion at said outlet end, and an internal annular wall receiving an upper end of said tubular plunger body, a radial flange extending from said tubular plunger body, with said plural, axially-extending spring fingers extending downwardly from said radial flange.

17. The pressure regulator of claim 16 wherein a radially inner end of said diaphragm is held in place by an annular retention ring; said radial flange formed with an annular upstanding wall, terminating at a radially outwardly extending rim at an upper end thereof, said rim engaged with said retention ring.

18. The pressure regulator of claim 14 wherein each of said arcuate slots extends substantially 90°.

19. The pressure regulator of claim 18 wherein each of said spiral grooves extends substantially 90°.

20. A pressure regulator comprising;
a housing assembly defining a fluid flow path from an inlet end to an outlet end;
a tubular plunger body supported within said housing assembly for linear movement toward and away from a valve seat in response to fluid pressure at said outlet end;
a sleeve supported within said housing assembly and adapted to engage said tubular plunger body; and
an actuator collar supported externally of said housing assembly, said actuator collar provided with at least one cam element and said sleeve provided with at least one spiral cam groove, said at least one cam element passing through said housing assembly and engaged within said at least one spiral earn groove whereby, when said actuator collar is rotated in one direction, a driving connection is established between said sleeve and said tubular plunger body that moves said tubular plunger body linearly toward said valve seat until a lower edge of said tubular plunger body engages said valve seat to thereby shut off flow through the regulator.

21. The pressure regulator of claim 20 wherein when said actuator collar is rotated in an opposite direction, said driving connection is broken.

22. The pressure regulator of claim 21 wherein a spring biases said tubular plunger body such that when said driving connection is broken, said spring and fluid pressure in the regulator move said tubular plunger body away from said seat.

23. The pressure regulator of claim 20 wherein said at least one cam element comprises a pair of substantially diametrically-opposed cam elements which pass through a pair of substantially diametrically-opposed arcuate slots in said housing assembly; and wherein said at least one spiral cam groove comprises a pair of substantially diametrically-opposed spiral cam grooves.

* * * * *